DEVICE FOR PRODUCING GASEOUS REACTANTS, PARTICULARLY HYDROGEN AND OXYGEN FOR FUEL CELLS

Original Filed Dec. 2, 1968

United States Patent Office

Re. 27,929
Reissued Feb. 26, 1974

27,929

DEVICE FOR PRODUCING GASEOUS REACTANTS, PARTICULARLY HYDROGEN AND OXYGEN FOR FUEL CELLS

Ferdinand von Sturm and Hans Kohlmuller, Erlangen, Germany, assignors to Siemens Aktiengesellschaft, Berlin and Munich, Germany Original No. 3,574,560, dated Apr. 13, 1971, Ser. No. 780,426, Dec. 2, 1968. Application for reissue Aug. 10, 1972, Ser. No. 279,736
Claims priority, application Germany, Dec. 2, 1967, P 16 67 277.8
Int. Cl. B01j 7/02
U.S. Cl. 23—282 4 Claims

Matter enclosed in heavy brackets [ ] appears in the original patent but forms no part of this reissue specification; matter printed in italics indicates the additions made by reissue.

ABSTRACT OF THE DISCLOSURE

Method of producing gaseous reactants, particularly hydrogen and oxygen, for fuel cells by reaction or catalytic dissociation of liquid or liquid-dissolved substances, with solid substances or solid catalysts, whereby the development of gas is automatically adjusted to the gas consumed. The liquid substance or the liquid-dissolved substance is placed into a storage container which is connected with a sealed gas chamber and also connected, via at least one line, to a reaction tube containing the solid substance or the solid catalyst. Thus when the pressure drops in the reaction tube, the liquid located in the storage container is further compressed into the reaction tube and when the pressure in the reaction tube rises, the liquid is either completely or partially returned to the storage container.

Figure 1:
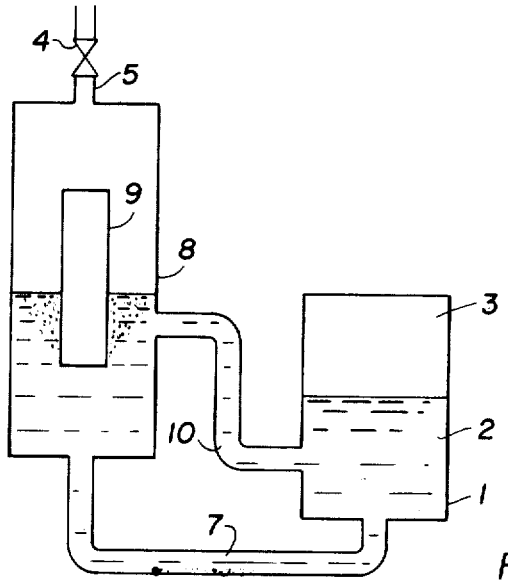

Most fuel cells today work with hydrogen and oxygen. These gases are usually stored in pressure bottles. A number of disadvantages must be accepted thereby, such as for example heavy pressure containers and difficulties in transporting the compressed gases.

It was, therefore, proposed to produce the gaseous reactants right at the locality of their employment, from liquid or solid substances. Thus, according to W. Vielstich (see "Brennstoffelements" (Fuel Elements), published by Chemie GmbH, Weinheim/Bergstr., Germany, 1965, page 172), hydrogen, which is needed in portable $H_2/O_2$ batteries, may be developed in a connected generator, by dissociation of sodium borate with 35% sulphuric acid.

Apparatus to produce gases from liquid and solid reactants have been long known. Thus, hydrogen is frequently produced in laboratories, by reacting zinc with hydrochloric acid in the well known Kipp generator.

All such apparatus require a column of liquid for producing an excess pressure of gas whereby the hydrostatic pressure of said liquid column must be in balance with the desired gas pressure.

It is also known that, as a rule, fuel cells have no uniform gas consumption, but rather because of different output requirements they have a variable gas consumption, which necessitates a control over the gas development process.

As stated, the control is usually connected with the output of energy. The effectiveness of batteries with smaller output capacities, therefore, is sharply reduced. This entails a marked disadvantage particularly in batteries which must operate for long periods without maintenance. The amount of reactants to be transported becomes critical for long periods of employment and is increased beyond the permissible limit, due to a decrease in the degree of efficiency.

It became necessary, therefore, to find a method and a device for producing gaseous reactants, particularly hydrogen and oxygen, for fuel cells through reaction or catalytic dissociation of liquid substances or substances dissolved in liquid, with solid substances, respectively solid catalysts, whereby the development of gas will be automatically adjusted to the gas absorption of the consumer.

The solution to the problem lies in placing the liquid substance or the substance dissolved in a liquid, into a storage container which is connected to a sealed gas chamber and is attached, via at least one supply line, to a reaction vessel which contains the solid substance or solid catalysts. Thus, when the pressure is reduced in the reaction vessel, the liquid contained in the storage container is further compressed into the reaction vessel and when the pressure in the reaction vessel rises, the liquid is transported, completely or partly, into the storage container.

The drawing illustrates in:

FIG. 1 an appropriate embodiment of the invention; and

Figure 2:
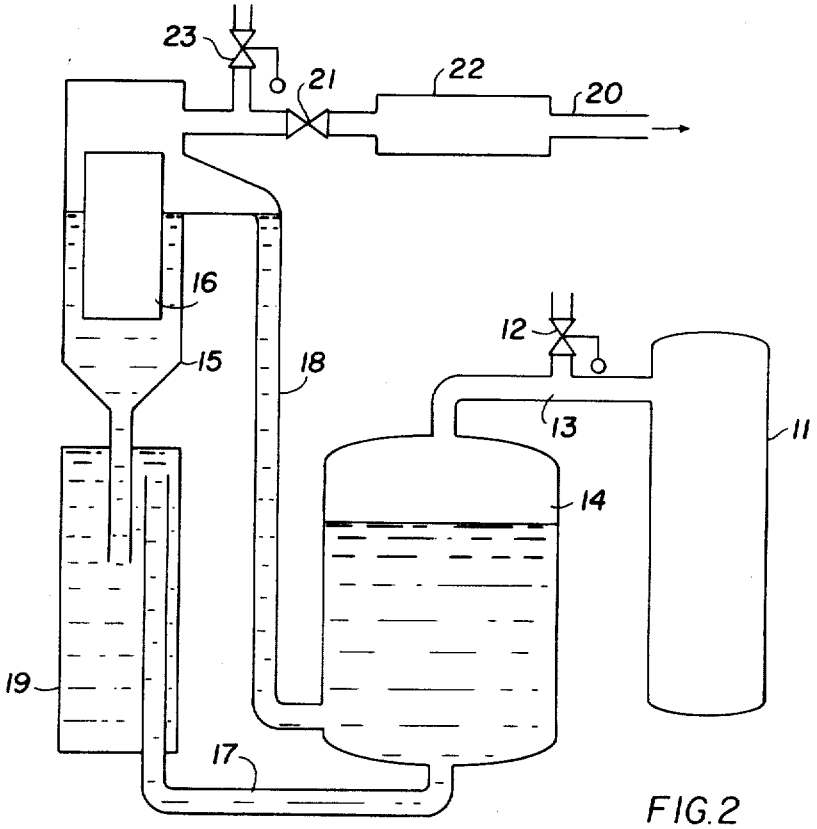

FIG. 2 a preferred embodiment.

The lower part of the storage container 1 holds the liquid 2, provided for reaction or catalytic dissociation, for example potash lye (KOH), while the upper portion 3 of the storage container holds the pressure gas, e.g. nitrogen, which serves as an automatic regulation of the gas production. When valve 4 is opened in the gas outlet tube 5, the resultant pressure drop in the reaction vessel and pressure difference causes the liquid 2 to flow into the reaction vessel 8 via connecting pipe 7. The solid substance 9 which is used as a catalyst or a reaction component is located within reaction vessel 8. The solid substance may be comprised of aluminum rods which are preferably placed into a suitable holding device, such as a tube of stainless steel, provided with a bottom screen. Gas begins to develop when the liquid comes in contact with the solid substance, which balances the pressure drop occurring thereby. If the gas consumption is increased, a new difference in pressure occurs and the liquid level in reaction vessel 8 rises. This increases the contact area of the solid substance with the liquid and, consequently, the amount of gas produced per time unit. If, on the other hand, the gas consumption is throttled, the pressure in the reaction vessel rises and the liquid flows from the reaction vessel back into the storage container until the pressure balance is reestablished. This reduces the contact surface of the solid substance with the liquid and thus adjusts automatically to the throttled gas consumption.

Similarly, the new method equalizes changes in reaction velocity which are caused by temperature fluctuations. Thus, an increase in temperature produces a stronger development of gas and results in an increased pressure in the reaction vessel and thus a reduction of the liquid in the reaction vessel. When the temperature decreases, the liquid in the reaction vessel rises.

The volume ratio of reaction vessel to the pressure gas chamber is determined by the difference between the minimum and the maximum operational pressure.

The hydrostatic pressure difference which is produced in the reaction vessel by the increase or reduction in the liquid level, must be applied as a correction only at very low gas pressures.

Thus, if the minimum operating pressure amounts to 0.5 atmosphere gauge and the intended safety pressure 0.6 atmosphere gauge, the volume in the pressure gas chamber should be about 30 liters when the reaction vessel holds 5 liters. To equalize the difference in concentration, which occurs during the reaction process in the reaction vessel, between the liquid in the reaction vessel and the liquid in the storage container, it is advisable to connect the reaction vessel to the storage container, via an additional pipe which is denoted at 10 in FIG. 1, namely in such a manner that during an increase in gas consumption and a rise in the liquid level to the point where pipe 10 enters into the reaction vessel, the liquid begins to circulate.

The circulation of liquid which occurs continually or periodically during an increase in the consumption of gas, is caused by a gas/liquid suspension which forms in the reaction vessel and which has a lower specific weight than the liquid in the remaining system. Simultaneously, fresh liquid enters from the storage contained into the reaction vessel via the pipe 7, with an increased development of gas.

According to a preferred embodiment of the invention, the gas chamber, which is provided for the regulation of the gas development, may be fashioned as an air chamber separate from the storage container. The air chamber 11 in FIG. 2 is connected, via a line 13 provided with safety valve 12, to the gas chamber of the storage container 14. This storage container is connected, via lines 17 and 18, to the reaction vessel or chamber 15, which contains the solid substance. Preferably, a sediment separator 19, which receives the undissolved reaction products, is in line 17. Gas is removed via outlet 20, which is connected in series with the valve 21 and a gas purifying cartridge 22. For safety reasons, safety valve 23 is inserted between the reaction vessel 15 and the valve 21.

The invention will be further illustrated by the following examples:

EXAMPLE 1

At 1 watt $H_2/O_2$ battery, which is supposed to operate without maintenance for 12 months and is operated with hydrogen produced from aluminum and potassium hydroxide, needs 0.46 liter of hydrogen per hour, at 25° C. and an efficiency of 78%. Accordingly, 325 g. $H_2$ are needed within a period of 12 months. Thus, in a device according to FIG. 2, at least 2.8 kg. aluminum will be needed in the reaction vessel and at least 18 1. 6 M KOH in the storage container, if dissolution is to occur up to aluminate. If there is a precipitation of sludge forming $Al(OH)_3$, a very much diluted potash lye may be used.

EXAMPLE 2

In a battery according to Example 1, hydrogen was obtained through catalytic dissociation of hydrazine. Thus 4.1 kg. hydrazine hydrate were needed for a 12 month operation of the battery. A platinum-plated nickel net served as a dissociation catalyst in the reaction vessel.

EXAMPLE 3

In a 20 w. $H_2/O_2$ battery, oxygen was produced through catalytic dissociation of $H_2O_2$, with a silver-plated nickel net. The battery efficiency was 72% and the oxygen consumption was 5.5 liters/hour, at 25° C. To keep this battery operating for 3 months without maintenance, 14.5 kg. $O_2$ were used. To this end, 100 kg. of 30% $H_2O_2$ solution were needed in the storage container.

The present method is not limited to the indicated examples and may be successfully employed also in other reactions which deliver hydrogen and oxygen. Thus, hydrogen can be obtained, for example, from water, with the aid of alkali metals. Also, metals such as zinc may be dissolved in acids, or hydrides such as lithiumhydride and sodium borate may be dissociated by water or acids.

What is claimed is:

1. A device for producing gases by reacting a liquid or liquid-dissolved substance with solid substances, comprising a reaction vessel wherein the solid substance is so positioned that when the liquid level rises, an increasing amount of the solid substance is contacted by the liquid, a storage container for the liquid, a sealed gas chamber connected with said storage container and a connecting line betwen the lower portions of said storage container and said reaction vessel, so that when the gas pressure in said reaction vessel drops, the gas pressure in said gas chamber transports liquid from said storage container into the reaction vessel, and when the gas pressure rises in the reaction vessel, the liquid is, at least partly, compressed back into said storage container, and a sediment separator connected into said connecting line between said storage container and said [gas chamber.] *reaction vessel.*

2. The device of claim 1, wherein a safety valve is provided at the outlet of the reaction vessel.

3. The device of claim 1, wherein a second connecting line is provided between the bottom part of said storage container and said reaction vessel, said second connecting line ending in the reaction vessel at the level of the solid substance.

4. The device of claim 1, wherein said sealed gas chamber is an air chamber connected with said storage container via a connecting line with a safety valve provided in this connecting line.

References Cited

The following references, cited by the Examiner, are of record in the patented file of this patent or the original patent.

UNITED STATES PATENTS

| | | | |
|---|---|---|---|
| 2,287,959 | 6/1942 | Bailey | 23—282 |
| 3,174,833 | 3/1965 | Blackmer | 23—282 |
| 3,364,070 | 1/1968 | Alexander | 136—86 |
| 3,453,086 | 7/1969 | Harin | 23—282 |
| 3,458,288 | 7/1969 | Latyatis et al. | 23—282 |
| 3,459,510 | 8/1969 | Litz et al. | 23—282 |

JOSEPH SCOVRONEK, Primary Examiner

U.S. Cl. X.R.

23—252 R, 260; 136—86 R